July 12, 1960
A. CHAUSSON
2,944,409
EQUIPMENT FOR COOLING VARIOUS FLUIDS AND MORE PARTICULARLY
AIR IN AIRCRAFT FLYING AT HIGH SPEED
Filed Jan. 20, 1958
2 Sheets-Sheet 1
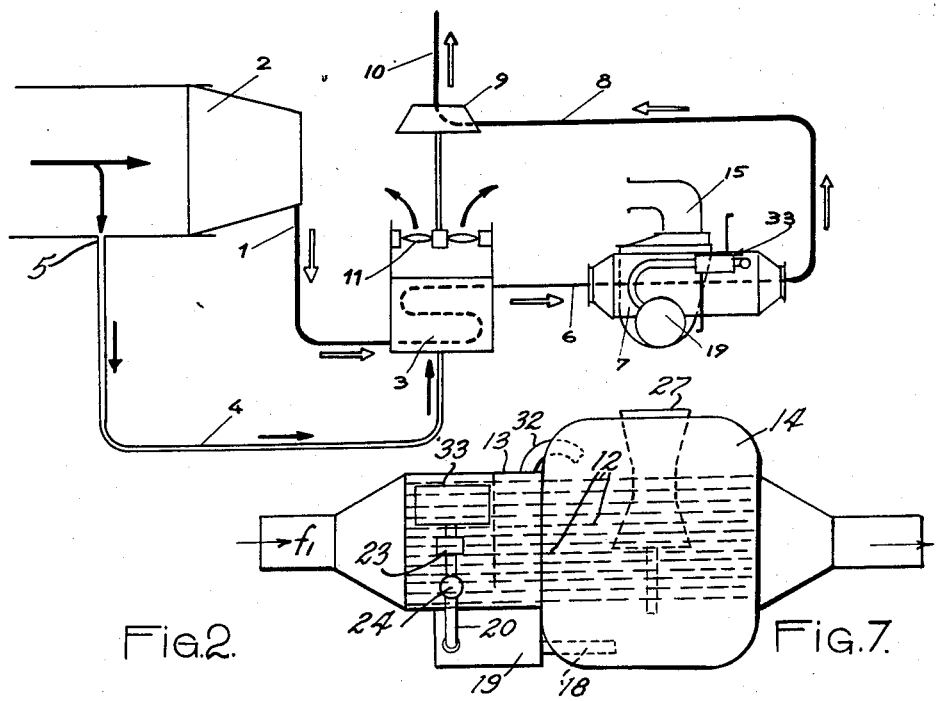
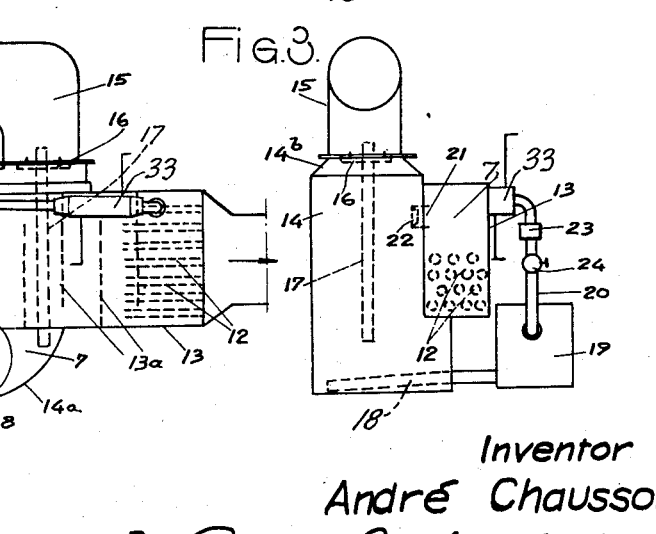
Inventor
André Chausson
By Reynolds, Beach & Christensen
Attorneys Inventor
André Chausson
Attorneys United States Patent Office 2,944,409
Patented July 12, 1960

2,944,409

EQUIPMENT FOR COOLING VARIOUS FLUIDS AND MORE PARTICULARLY AIR IN AIRCRAFT FLYING AT HIGH SPEED

André Chausson, Asnieres, France, assignor to Societe Anonyme des Usines Chausson, Asnieres, France, a company of France Filed Jan. 20, 1958, Ser. No. 709,975

Claims priority, application France Jan. 22, 1957

13 Claims. (Cl. 62—169)

It is necessary, in aircraft travelling at high altitude and great speed, to maintain a suitable cabin air pressure, that is to say, inside the cabin and the compartment or compartments containing certain apparatuses. Moreover, this cabin air must be sufficiently cool.

As explained in my pending application Serial No. 598,847, the cooling problem is complicated by the fact that at high speed, the external air immediately surrounding the aircraft and intaken thereby is heated to such an extent that it becomes impossible to use it as a cooling fluid in an ordinary exchanger.

For example, the intaken air is at a temperature exceeding that of the ambient air by about 190° centigrade, when the aircraft is travelling at a speed of 2,500 kilometres an hour.

With a properly working heat exchanger, the cooling air at the exit from this heat exchanger is at a temperature exceeding that of the cooling air at the entry, by at least twenty degrees. This means that under the conditions of travelling at high speed, the temperature drop to be produced by an expansion turbine becomes too considerable for apparatus of permissible weight and size.

In principle, cooling in an evaporator exchanger allows the temperature of the intaken air for use in the cabin to be lowered to any required value independently of the temperature of the external air, by means of suitably selecting a volatile liquid.

Nevertheless, it must be considered that for a motionless liquid, only disturbed by natural convection currents, evaporation speedily becomes less and less as the evaporation temperature lowers. Thus, for the same difference in temperature between the wall of the exchanger and the volatile liquid, such as water, the latter only evaporates 25 times slower at pressure corresponding to an altitude of 20,000 metres than where subject to sea level pressure, and methylic alcohol at about 20 times slower.

The application Serial No. 598,847 referred to above discloses how cooling can be effected under such conditions by conveying the volatile coolant liquid through a path in one part whereof it is pressurized to remain in liquid phase while in heat exchange relation to the intaken cabin air, and in a second part whereof it is subject only to the lower ambient pressure and so vaporizes in part, thereby losing much more heat than if it were maintained throughout in liquid phase, and cooling the still liquid remainder to a sufficiently low value that when the remainder is recirculated in heat exchange relation to the intaken cabin air it effectively cools the latter.

The present invention relates to improvements applied to the means employed for producing this second part evaporation exchanger. Actually aircraft flying at high speed most frequently traverse distinctly sloping paths relative to the horizontal and the direction of these paths sometimes varies very quickly and to considerable degrees. Consequently, it is necessary that the nest of cooling tubes for the cabin air be always completely bathed by the cooling liquid, no matter what the slope of its path may be or the attitude of the aircraft.

What is described hereinafter enables this result to be attained by making the operation of the equipment possible, no matter what may be the attitude of the aircraft with relation to the horizontal.

According to the invention, the equipment comprises an evaporation exchanger comprising a nest of tubes at least partly placed in a casing communicating, by means of a calibrated valve (one which is set to open at and above a given pressure) with a tank whose interior is in communication with the atmosphere, this tank containing a liquid sucked in by a device which delivers it into the casing containing the exchanger nest of tubes, so that this casing is always full, no matter what the slope of the equipment assembly or the aircraft wherein it is installed.

Various other characteristics of the invention will become apparent in the detailed description which follows.

Forms of embodiment of the invention are shown, by way of non-limitative examples, in the attached drawings.

Figure 1 is a general diagrammatic elevation-section of an equipment for a pressurized cabin for an aircraft.

Figure 2 is a diagrammatic side elevation of a form of embodiment of an evaporative cooling device according to the invention, included as part of the equipment of Figure 1.

Figure 3 is an elevation from a viewpoint at 90° to that of Figure 2.

Figure 7 is an elevational diagram of the pressurized portion of the coolant path, but illustrating a further modification.

Figure 4:
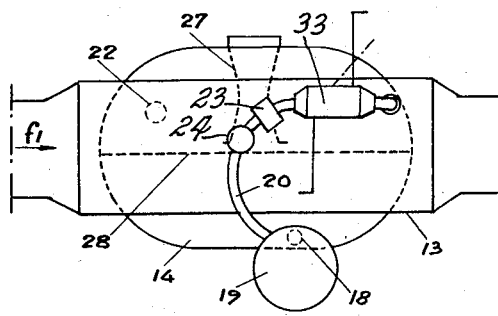
Figure 4 is a similar elevation to Figure 2, showing an alternative form.

Figure 1 shows an example of an embodiment of a complete system for cooling and renewing the cabin air in the pressurized cabin of an airplane. This equipment is described so that the means for operating stated in the present invention may be properly understood, being given only to illustrate a possible form of embodiment, as numerous other forms can be employed, varying more particularly in accordance with the method of propelling the airplane, which is assumed, in the system shown, to be provided with a turbo-jet engine.

The air to be introduced into the cabin or any other space of the aircraft is bled off by a pipe 1 at the high pressure side 2 of the jet engine's compressor so that this air is under a pressure that is substantially higher than the utilization pressure in the cabin. The pressure of the air conveyed by the pipe 1 being distinctly greater than the pressure of the ambient air surrounding the machine, and this air being compressed by the jet engine compressor, its temperature is consequently higher than the temperature of the air at the input of the compressor.

For producing pre-cooling of the air conveyed by the pipe 1, the latter communicates with the input of a heat exchanger 3 in which the air circulates that is brought in by the piping 4 from a connection at 5, for example, with the input portion of the jet engine's compressor. After pre-cooling carried out in the exchanger 3, the air conveyed by the pipe 1 is led by piping 6 into a second exchanger 7 which is the subject of this invention, and is made as hereinafter explained.

The air cooled in the exchanger 7, which is always at a pressure exceeding utilization pressure and which is not yet necessarily lowered to the required temperature, is conveyed by a piping 8 into an expansion turbine 9 for directly supplying the cabin through the piping 10. The power developed, by which the turbine 9 is driven, is advantageously used for driving a fan 11 intended to activate the circulation of the cooling air conveyed by the piping 4 into the first exchanger 3.

The cooling exchanger 7 in one of its possible forms is shown in Figures 2 and 3. This exchanger comprises, for example, a nest of tubes 12 through which the air circulates on its way to the cabin. This nest of tubes is placed inside a casing 13 which is airtight and provided with baffle plates 13a.

The casing 13 is attached to the side of a tank 14 of relatively large size containing water or other volatile coolant liquid, whose bottom 14a is rounded, for example, and whose top 14b forms a duct communicating with a tubular elbow 15 whose outlet is open to the atmosphere.

The opening provided in the top 14b of the tank is controlled by a valve 16 normally open, when the exchanger is in the attitude shown in the drawing, for maintaining the interior of the tank at atmospheric pressure. The valve 16 is provided with a tubular stem 17 which emerges at one end into the tubular elbow 15, and at its opposite end within the bottom of the tank. This valve is so constructed that it is open when the aircraft is horizontal or inclined until a predetermined value for which the liquid contained inside the tank cannot flow through the opening provided in the top 14b. In case the aircraft is placed along a very sloped path or is flying upside down, this valve closes and the inside of the tank communicates with the atmosphere only through the tubular stem 17 of this valve. Such a valve can be constructed readily by a person skilled in the art and it can be operated by several means such as, for instance, by gravity or mechanically or by any other appropriate means, the detailed description of which does not appear necessary, since only the function of that valve is important for proper understanding of the invention.

The tank 14 contains a tube 18, formed, for example, of a flexible weighted pipe whose length is selected so that its inlet can be practically situated at the lowest point of whatever attitude the latter may assume, as hereinafter explained. The tube 18 serves to supply a pump 19 with the coolant liquid that is contained within the tank and/or the exchanger casing. The delivery from the pump 19 is discharged through a pipe 20, into the casing 13 of the exchanger. The upper portion of the casing 13 is put into communication with the interior of the tank 14 by an opening 21 controlled by a calibrated valve 22, set to open at and above a given pressure.

When the pump 19 is in operation, the liquid withdrawn from the tank is delivered into the casing 13 containing the nest of tubes 12, this liquid being compelled to follow the course defined by the baffle plates 13a and thus circulating in the direction opposite to the direction in which the air traversing the nest of tubes flows following the arrow F1.

At the outlet of the casing 13, the liquid returns into the tank 14 by passing through the valve 22. Seeing that the calibration of this valve, that is to say, the pressure at which it will open, can be adjusted at will, the pressure of the liquid inside the casing 13 can be maintained at a level greatly exceeding the atmospheric pressure prevailing in the tank, so that there is no risk of the liquid inside the casing 13 becoming raised to boiling temperature, even if the atmospheric pressure prevailing in the tank 14 is low and corresponds to a value at which the liquid boils in the tank, taking into account the temperature to which it has been raised owing to the heat exchange which has taken place inside the casing 13.

Since the inside of the tank 14 is at atmospheric pressure, there is a progressive evaporation of the liquid that it contains and hence a cooling of the remaining liquid, even if boiling temperature is reached.

As the piping 18 always withdraws liquid from the lowest part of the tank, it follows that the liquid conveyed into the exchanger casing 13 is always at the lowest possible temperature, and furthermore, the risk of carrying along air bubbles is extremely slight, so that the exchanger casing is continually filled with coolant in liquid phase, which enables the exchanger to work under the best conditions.

Aircraft, for which this device is intended, can assume any kind of attitude in relation to the horizontal without affecting the working of the equipment, seeing that the casing 13 of the exchanger is fed by the pump and that the inlet to the input piping 18 for liquid always seeks the bottom part of the tank, which contains a maximum quantity of liquid approximately equal to half its total capacity. If we consider that an aircraft travelling along a very sloping path, or even flying upside down, has the effect of causing the valve 16 to close, this shuts off communication between the tank 14 and the tubular elbow 15, but at this moment the liquid no longer covers the bottom part of the tubular tail-piece 17, and consequently, communication between the atmosphere and the inside of the tank is, at this moment, set up by this tubular tail-piece 17.

The apparatus described above moreover comprises a safety device which includes a non-return valve 23 fitted in the supply piping 20 of the casing 13 of the exchanger, which prevents loss of liquid from the casing when the tank is empty, thereby maintaining this liquid inside the casing 13, the temperature whereof obviously increases up to the moment when evaporation occurs, which sets up sufficient pressure for opening the valve 22 through which the steam escapes. Under these conditions, the delivery of the exchanger obviously decreases, but it still enables the air in the cabin to be cooled for a certain time. Furthermore, the moment the pump 19 ceases delivering, such delivery failure is indicated to the pilot of the aircraft by a manometric device 24 mounted upstream of the non-return valve 23 or in combination with the latter. When the pump operation is normal, the manometric device 24 keeps a green lamp 25 alight, for example, and when the circulation ceases, a red lamp 26 lights up, at the same time that the lamp 25 goes out. The pilot of the aircraft is thus warned at that moment that the exchanger will only continue working for a short time, but this being known, is normally sufficient for him to be able to slow down his motor.

It is possible, in addition to the cooling of the air, to cool liquids such, for instance, as lubricating oil or liquids for hydraulic control. For this purpose, I provide a heat exchanger device 33 of known construction which may comprise a housing for location of a coil or of a nest of tubes through which the liquid to be cooled is circulated, said housing being connected to the piping 20 supplying the coolant to the casing 13 in such a manner that the coolant is obliged to pass through said housing of the heat exchanger 33, in heat exchange relation to the coil or nest of tubes, before it enters the casing 13.

Figure 5:
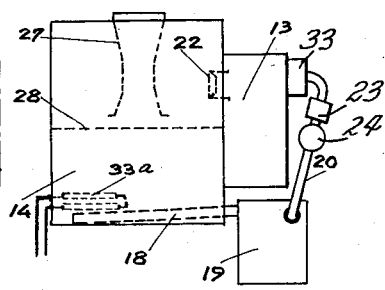
Figure 5 is an elevation from a viewpoint at 90° to that of Figure 4, illustrating the same form.

According to the alternative shown in Figures 4 and 5, the tank 14 has a shape, the longitudinal section whereof is oblong and corresponds, for example, to an ellipse. This tank has a nozzle 27 within it, open at both ends and projecting outside the tank so that the interior of the latter is put into communication with the atmosphere, by means of the lower part opening slightly above the middle plane designated by 28 of said tank 14. The maximum level of the liquid contained by the tank is always below the middle plane when the tank is horizontal. In this manner, whatever the slope of the aircraft in relation to the horizontal, the liquid never comes flush with the inside opening of the nozzle 27, and consequently, there is no risk of loss of liquid, other than by evaporation.

The various other elements of the apparatus are identical with what is described with reference to Figures 2 and 3, and consequently, they function in the same manner.

As shown in dotted lines and designated by 33a in Figure 5, it is further possible to place a second heat exchanger device for liquid inside the tank 14, this second exchanger device being constituted similarly to the exchanger device 33 and being used, for instance, for the cooling of a liquid which cannot be supplied through the heat exchanger 33.

As can be seen from the foregoing, the advantage of the arrangement using the nozzle 27 lies in the fact that it is not longer necessary to use the valve 16, so that the risk of incomplete water-tightness or faulty working of the latter is thus eliminated.

Figure 6:
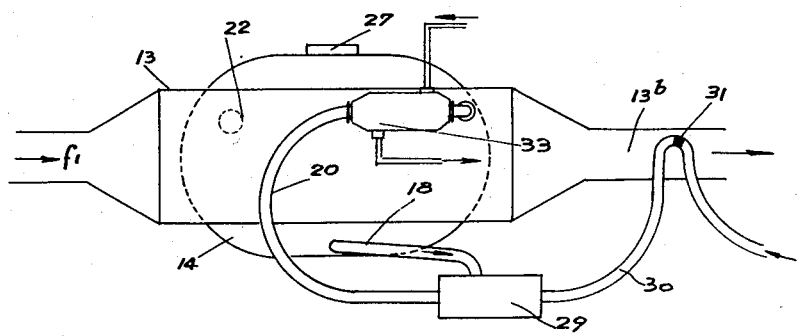
Figure 6 is a similar elevation to Figures 2 and 4 of another modification.

The alternative embodiment shown in Figure 6 enables a unit to be employed which does not incorporate the pump 19. According to this alternative, an injector 29 operated by compressed air supplied by way of feed pipe 30 is fitted between the intake piping 18 for the liquid in the tank 14 and the piping 20 leading to the inlet to the exchanger casing 13. The form of embodiment of this compressed air injector device being well known, it is not described in detail in this present specification.

In order to obtain automatic working of the equipment, it is advantageous that the feed pipe 30 for compressed air to the injector 29 should traverse the outlet 13b of the exchanger, this pipe 30 being controlled by a fusible cartridge 31, which is melted when the temperature of the air at the output of the exchanger device exceeds a certain value at which it is necessary for cooling by evaporation. When the cartridge 31 is melted the pipe 30 is opened and the injector 29 becomes operative at that predetermined temperature at which the cartridge 31 melts.

The injection device described above may be used in combination with the normal pump mechanism, in which case it merely forms a safety unit that comes into operation in the event of the pump 19 or the members driving it are disabled. It is also possible for the compressed air injector 29 to be operated by hand instead of using the fusible cartridge 31, or, on the other hand, the cartridge 31, can be used for starting up the pump 19, when the latter is to be automatically driven. Seeing that the injected air is mixed with the liquid inside the top of the exchanger casing 13, when the device must work solely by means of the compressed air injector, it is obviously necessary to calculate the exchange surface of the exchanger so as to take into account this circumstance, which reduces the value of heat exchange per unit of exchanger surface. The pressure inside the exchanger top can, as previously, be regulated by the valve 22, which enables a suitable circulation rate of the liquid to be obtained, which then returns to the tank, where it partially evaporates.

Figure 7 illustrates another modification, leading to a simple embodiment, which is adapted for cooling various apparatuses, pilotless aircraft or missiles, guided or otherwise. The nest of tubes 12 of the exchanger is partly inside the exchanger casing 13, and partly inside the tank 14, so that this latter part is immersed in the boiling liquid at ambient pressure and/or in contact with the steam produced by this liquid. It is also possible, as shown in Figure 8, that the external part of the nest of tubes 12 be simply in a space subject to ambient pressure.

Figure 8:
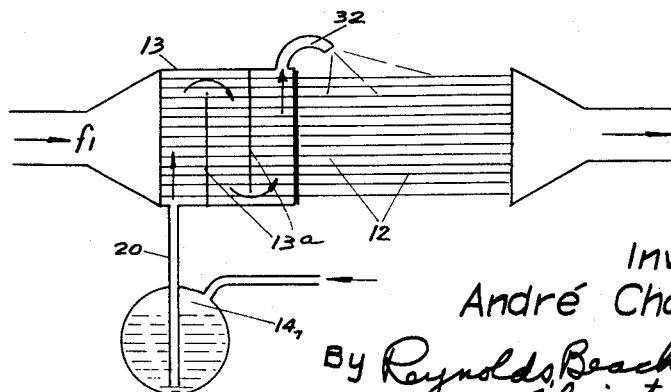
Figure 8 is a diagrammatic elevation-section showing a still further alternative embodiment, similar to that of Figure 7.

According to these latter forms of embodiment, shown in Figures 7 and 8, the casing 13 is provided with atomizers whose discharge is carefully calibrated so that the delivery of liquid from within the casing 13 is substantially equal to the quantity of liquid evaporated per unit of time. In this manner, the temperature inside the casing 13 is kept higher than the boiling temperature under ambient pressure and the super-heated liquid in the casing vaporizes at the output of the atomizers 32 at a temperature corresponding to this ambient pressure. This vaporization takes place around the part of the nest of tubes which is external of casing 13, in which external part a second cooling stage of the utilization fluid occurs.

This cooling is effected by evaporation on the walls of the nest of tubes of the liquid carried along by the steam produced at the output of the atomizers, as well as by the super-heating of the steam produced both directly at the output of the atomizers as well as the evaporation of the liquid carried along.

It will thus be seen that the amount of heat extracted per unit weight of liquid evaporated is greater than with the circulation system over the whole of the exchange and evaporation surface in the tank, such as has been previously described. Actually, with this system, the amount of heat taken from the liquid is strictly equal to its latent heat of evaporation at ambient pressure. If we take this amount of heat as a basis, and if, on the other hand, we take into account that a quantity of 10 to 20 percent of non-evaporated liquid is undoubtedly carried along by steam towards the discharge opening, whatever the practical devices used for recovering this liquid, we then have a utilization efficiency varying from 0.8 to 0.9 of the liquid.

The arrangement of Figure 8 enables an amount of heat to be removed from the liquid that is equal, as formerly, to the evaporation heat, to which must be added that corresponding to the heating up of the steam in the external part of the nest of tubes of the casing 13. Moreover, the superheating of the steam prevailing in that part of the nest of tubes, makes it impossible for the non-evaporated liquid to come out through the discharge opening. One must also take into account, the fact that owing to assumed conditions of use, the liquid contained in the tank 14₁, which can be lagged, reaches the casing 13 at its storage temperature lower than boiling temperature at ambient pressure, which affords an additional heating margin for the liquid in the casing 13. The utilization efficiency of the liquid, defined above, is thus greater than one and, according to the temperatures chosen, can reach substantially 1.04. The driving medium ensuring the displacement of the liquid can be compressed air taken off the compressor of the jet engine if such is available, or a compressed air flask, which acts on the liquid contained in a tank 14₁.

According to the arrangement selected, the nature of the liquid employed, and/or if it is necessary to continuously supply the nest of tubes for all flying attitudes, the air pressure can be directly exerted on the free surface of the liquid contained in the tank 14₁, as shown, or else this air pressure can be exerted by means of a deformable flexible diaphragm, such as a rubber bladder, which thrusts the liquid like a piston. Numerous other means can, moreover, be considered for effecting circulation of the liquid.

The starting up of the apparatus can be effected automatically, as described above, by making use of a fusible cartridge, for example.

As can be seen from the foregoing, the working of the equipment according to the invention is extremely flexible, seeing that for certain speeds of airplanes or other aircraft or missiles it is possible to utilize the primary exchanger 3 only, described with reference to Figure 1, the air then passing into the nest of tubes 12 without being cooled there again, because neither the pump 19 nor the injector 29 is put into operation, since the starting up of these latter members only takes place when the speed of the engine exceeds a given value.

This arrangement is particularly interesting for interception planes or devices which only reach their maximum speed during a very short time and which then slow down considerably to reduce fuel consumption, which enables them to have a relatively considerable range of action.

I claim:

1. An evaporator type heat exchanger particularly for high speed aircraft in which air is to be cooled, comprising a nest of tubes for circulation of the air to be cooled, a casing enclosing at least in part said nest of tubes, said casing being completely filled with a volatile coolant liquid, a tank partially filled with said coolant liquid and provided with an opening for communication with the atmosphere, control means preventing any loss of coolant liquid through such opening when such opening is disposed below the tank during sloping flight paths of the aircraft, means for withdrawing the coolant liquid from said tank and delivering it under pressure into said casing, and calibrated means controlling communication between said casing and said tank, said calibrated means being loaded so that the pressure inside said casing prevents boiling of said coolant liquid.

2. An evaporator type heat exchanger as set forth in claim 1 in which the control means comprise a valve for controlling the opening of the tank for communication with the atmosphere and a duct carried by said valve and opening on both sides thereof, said duct further extending to a location near the bottom of the tank so that it is in communication with the atmosphere when said valve is closed to shut the opening when said aircraft is sloped.

3. An evaporator type heat exchanger as set forth in claim 1 in which the tank contains a charge of coolant liquid the volume of which is substantially equal to half its capacity and the tank has a nozzle projecting outside and extending inside, opening just above the level of the liquid in the tank, said nozzle being further located inside the tank substantially at the middle portion thereof so that the liquid is prevented from escaping through said nozzle when the tank is sloped.

4. An evaporator type heat exchanger as set forth in claim 1 in which the means for withdrawing liquid from the tank includes flexible weighted pipe means extending inside the tank to be kept at the lowest portion thereof.

5. An evaporator type heat exchanger as set forth in claim 1 comprising further a non-return valve interposed between the casing and the means for withdrawing the coolant liquid from the tank.

6. An evaporator type heat exchanger as set forth in claim 1, comprising further a hollow device for circulating a liquid to be cooled, said hollow device being located inside the tank whereby it is immersed in said coolant liquid.

7. An evaporator type heat exchanger as set forth in claim 1, comprising further a hollow device for circulating a liquid to be cooled, said hollow device being carried by the casing and traversed by the means for delivering liquid under pressure into the casing.

8. An evaporator type heat exchanger as set forth in claim 1, wherein the nest of tubes is located in part within and in part exteriorly of the casing, and an atomizer the discharge whereof is of predetermined amount, connected to receive coolant liquid from within said casing and arranged to discharge the same onto the exterior part of the nest of tubes.

9. An evaporator type heat exchanger as set forth in claim 8, wherein the exterior part of the nest of tubes is enclosed within said tank, the interior of which is at atmospheric pressure.

10. An evaporator type heat exchanger, particularly for high speed aircraft in which air is to be cooled, comprising a nest of tubes for circulation of the air to be cooled, a casing enclosing at least in part said nest of tubes, said casing being completely filled with a volatile coolant liquid, a tank integral with said casing to form a compact unit, said tank being in part filled with coolant liquid and being provided with an opening for communication with the atmosphere, means enclosed in said tank to prevent flowing of the coolant liquid through such opening when such opening is disposed below the level of the liquid in said tank during sloped flight paths of the aircraft, transfer means for circulating such liquid from said tank to said casing in which said liquid is subjected to a pressure preventing its boiling, and calibrated means interposed between said casing and said tank to regulate the circulation and the pressure of the liquid inside said casing.

11. An evaporator type heat exchanger as set forth in claim 10 in which the transfer means comprises a pump and a non-return valve interposed between the tank and the casing.

12. An evaporator type heat exchanger as set forth in claim 10 in which the transfer means comprises an air injector interposed between the tank and the casing.

13. An evaporator type heat exchanger as set forth in claim 12 comprising further a feeding duct for supplying compressed air to the air injector, said feeding duct being shaped to intercept the outlet of the nest of tubes in which air is cooled, and said feeding duct enclosing a fusible cartridge closing it, to be melted when the cooled air reaches a predetermined temperature for activating the injector.

References Cited in the file of this patent

UNITED STATES PATENTS

| | | |
|---|---|---|
| 2,477,932 | King | Aug. 2, 1949 |
| 2,664,001 | Brisken | Dec. 29, 1953 |